United States Patent
Rao

(10) Patent No.: US 9,287,929 B2
(45) Date of Patent: Mar. 15, 2016

(54) ROBUST HANDSHAKE PROCEDURE IN CROSS-TALK ENVIRONMENTS

(71) Applicant: IKANOS COMMUNICATIONS, INC., Fremont, CA (US)

(72) Inventor: Murli Mohan Rao, Morganville, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 32 days.

(21) Appl. No.: 13/967,650

(22) Filed: Aug. 15, 2013

(65) Prior Publication Data

US 2014/0050273 A1 Feb. 20, 2014

Related U.S. Application Data

(60) Provisional application No. 61/683,611, filed on Aug. 15, 2012.

(51) Int. Cl.
*H04B 3/32* (2006.01)

(52) U.S. Cl.
CPC ........................................ *H04B 3/32* (2013.01)

(58) Field of Classification Search
None
See application file for complete search history.

(56) References Cited

U.S. PATENT DOCUMENTS

| | | | | |
|---|---|---|---|---|
| 6,253,247 B1* | 6/2001 | Bhaskar et al. | ................ | 709/237 |
| 6,487,241 B1* | 11/2002 | Cole | ............................. | 375/220 |
| 7,180,936 B1* | 2/2007 | Long et al. | .................... | 375/222 |
| 2004/0114678 A1* | 6/2004 | Langberg et al. | ............. | 375/222 |
| 2004/0152446 A1* | 8/2004 | Saunders et al. | .............. | 455/411 |
| 2005/0175078 A1 | 8/2005 | Redfern | | |
| 2006/0079203 A1* | 4/2006 | Nicolini | ......................... | 455/411 |
| 2006/0120309 A1* | 6/2006 | Bigras et al. | .................. | 370/310 |
| 2007/0259680 A1* | 11/2007 | Stolle et al. | .................... | 455/522 |
| 2008/0215883 A1* | 9/2008 | Fok et al. | ....................... | 713/167 |
| 2008/0253562 A1 | 10/2008 | Nyberg | | |
| 2009/0271550 A1* | 10/2009 | Clausen et al. | ................ | 710/269 |
| 2010/0080377 A1* | 4/2010 | Gould et al. | ............. | 379/265.09 |
| 2010/0082821 A1* | 4/2010 | Rosenblatt et al. | ........... | 709/228 |
| 2011/0051906 A1* | 3/2011 | Cioffi et al. | ................ | 379/32.04 |
| 2011/0075829 A1* | 3/2011 | Goldman et al. | ........ | 379/202.01 |
| 2011/0280398 A1* | 11/2011 | Fradis | ........................... | 380/201 |
| 2011/0296226 A1 | 12/2011 | Sorbara et al. | | |
| 2012/0030475 A1* | 2/2012 | Ma et al. | ....................... | 713/186 |
| 2012/0183026 A1 | 7/2012 | Eriksson et al. | | |
| 2013/0251141 A1* | 9/2013 | Mermans | ................. | 379/406.06 |

(Continued)

FOREIGN PATENT DOCUMENTS

WO WO2012/076598 A1 6/2012

OTHER PUBLICATIONS

ITU-T G.994.1, handshake procedures for digital subscriber line transceivers, Jun. 2012, pp. 1-891.*

(Continued)

*Primary Examiner* — Hicham Foud
(74) *Attorney, Agent, or Firm* — Holland & Hart LLP

(57) ABSTRACT

Embodiments of the invention provide a robust mechanism to isolate transceivers that attempt to train on a FEXT channel during the handshake phase and to abort a false activation. According to aspects of the invention, either or both transceiver acknowledges the unique identity of the other transceiver during the handshake phase. This ensures that the transceiver progresses to training and beyond with only one other remote transceiver.

20 Claims, 3 Drawing Sheets

(56) References Cited

U.S. PATENT DOCUMENTS

2014/0155033 A1\* 6/2014 Lazaridus et al. ............ 455/411
2014/0351310 A1\* 11/2014 Ligman et al. ................ 709/201

OTHER PUBLICATIONS

International Search Report and Written Opinion issued Nov. 26, 2013 for PCT/US2013/055089.

\* cited by examiner

ROBUST HANDSHAKE PROCEDURE IN CROSS-TALK ENVIRONMENTS

CROSS-REFERENCE TO RELATED APPLICATIONS

The present application claims priority to U.S. Prov. Appln. No. 61/683,611 filed Aug. 15, 2012, the contents of which are incorporated herein by reference in their entirety.

FIELD OF THE INVENTION

The present invention relates generally to communications and more particularly to training of transceivers in a xDSL communications system.

BACKGROUND OF THE INVENTION

G.994.1 provides a flexible mechanism for DSL transceivers to exchange capabilities and select a common mode of operation. However it lacks the capability to prevent two or more transceivers from training up against one remote transceiver in high cross-talk environments, where one connection is via a crosstalk channel.

For example, quite often, while one transceiver trains up against the remote transceiver on the direct channel, another transceiver trains up against the same remote transceiver on the FEXT channel. This FEXT channel transceiver quite often passes handshake and several phases of channel discovery before failing activation. This false training can be quite problematic for vectored VDSL2 (G.vector) systems, and could cause other lines to retrain as well.

In vectored VDSL2, for example, it has been observed that after a handshake session one VTU-O (i.e. central office (CO) based VDSL2 modem) may establish connection with two VTU-R's (i.e. customer premises location based modems (CPE)) simultaneously. In this event, as an example, it is possible that two modems on the CPE side of the line may try to initialize with a single modem on the CO side of this line. Under normal operating conditions, specifically VDSL operating without vectoring, the CPE modem on the direct channel will (hopefully) observe significantly better SNR during the training phase of initialization and that across the crosstalk channel will observe a very poor SNR and eventually abort initialization. However, if this event were to occur in a Vectored VDSL2 system, then some issues can occur in the updating of the channel matrix when a new line is joining and a secondary line via the crosstalk path are both trying to join the vectored group; this is the situation demonstrated in FIG. 1.

As shown in FIG. 1, there are a number of lines (represented by VTU-O#1 thru VTU-O#3 in a CO-side DSLAM 110) operating in a vectored group 102 and in Showtime; the crosstalk within the vectored group is being cancelled by the VCE in the CO. As further shown, Line #J1 associated with CPE modem VTU-R #J1 106 desires to join the vectored group 102. During handshake, however, there are two CPE modems communicating with VTU-O#J1, the desired VTU-R#J1 106 and another modem VTU-R#J1F 104 via the crosstalk coupling path. During Handshake, it is possible that both CPE devices establish communication with VTU-O#J1 and enter the initialization phase. During the channel discovery phase, pilot sequences are communicated in the downstream direction via the O-SIGNATURE message and if upstream vectoring is enabled, then pilot sequences for the upstream channel will be communicated to the CPE for application in the upstream direction in training sequence R-P-Vector 1. In this case two CPE modems will be sending the same pilot sequence upstream in R-P-Vector 1 during Channel Discovery. The fact that two modems are sending the same pilot sequence can cause confusion in updating the crosstalk channel matrix in the upstream direction. It is not until the training phase where SNR measurements are made and one line can be dropped due to poor SNR readings but by this time some potential harm may have been done to the upstream crosstalk channel matrix.

It is strongly desired that connection out of handshake be done with only one modem pair and avoid application of one pilot sequence across more than one line, even if the connection were established via the crosstalk channel as opposed to the direct channel.

SUMMARY OF THE INVENTION

Embodiments of the invention provide a robust mechanism to isolate transceivers that attempt to train on a FEXT channel during the handshake phase and to abort a false activation. According to aspects of the invention, either or both transceiver(s) acknowledges the unique identity of the other transceiver during the handshake phase. This ensures that the transceiver progresses to training and beyond with only one other remote transceiver. According to certain additional aspects, this protocol addresses a long-standing issue where multiple transceivers try to activate against one remote transceiver. For G.vector systems, this can provide certain advantages. Currently, without such a protocol, both transceivers may progress into channel-discovery/training, and FEXT contributions from the actual and cross-talk channel transceiver become indistinguishable, which may lead to sub-optimal performance: lower SNR, CRCs, and line-retrains. The present invention addresses this issue, among others.

In accordance with these and other aspects, a method for identifying transceivers that train on a FEXT channel according to embodiments of the invention includes initiating a handshake phase comprising a plurality of handshake messages between a first transceiver and a second transceiver, generating a unique ID at the first transceiver, sending the unique ID from the first transceiver to the second transceiver using one of the handshake messages, receiving a different one of the handshake messages including an ID value, and aborting the handshake phase if the received ID value does not match the unique ID. The ID may also be communicated during the O-SIGNATURE message for final confirmation across a unique channel.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

According to certain aspects, the invention provides a robust protocol that allows one transceiver to uniquely identify a remote transceiver. This ensures that the transceiver progresses to training and beyond with only one other remote transceiver. For example, any transceiver that ends up activating over a cross-talk channel can thus be detected early in handshake when its identity does not match an expected identity.

Figure 1:
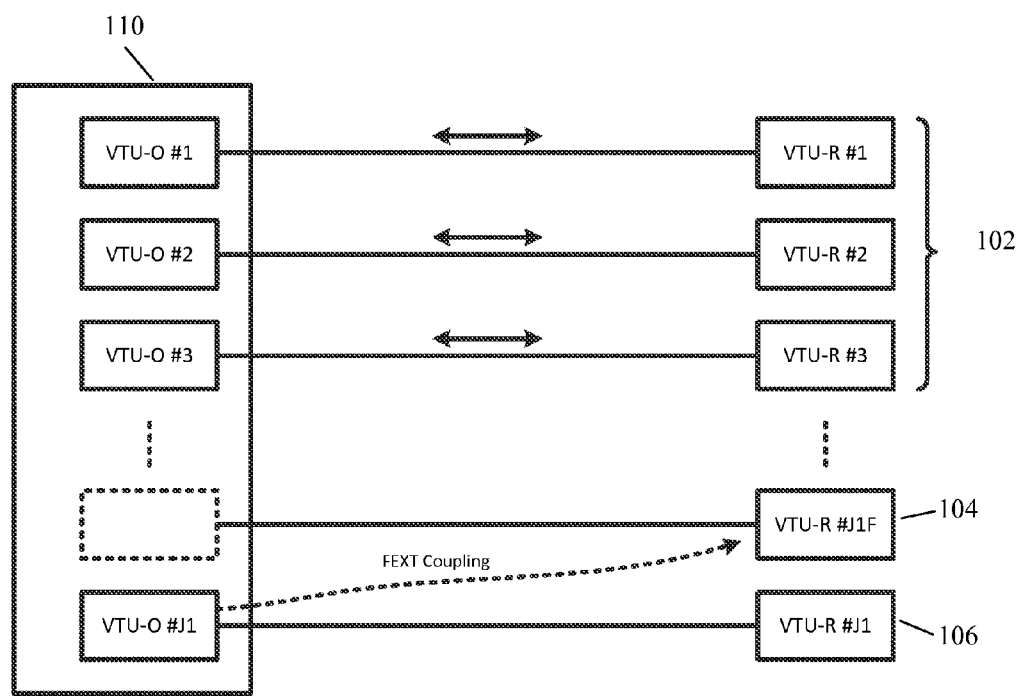
FIG. 1 is a diagram illustrating certain problems in existing VDSL systems.
Figure 2:
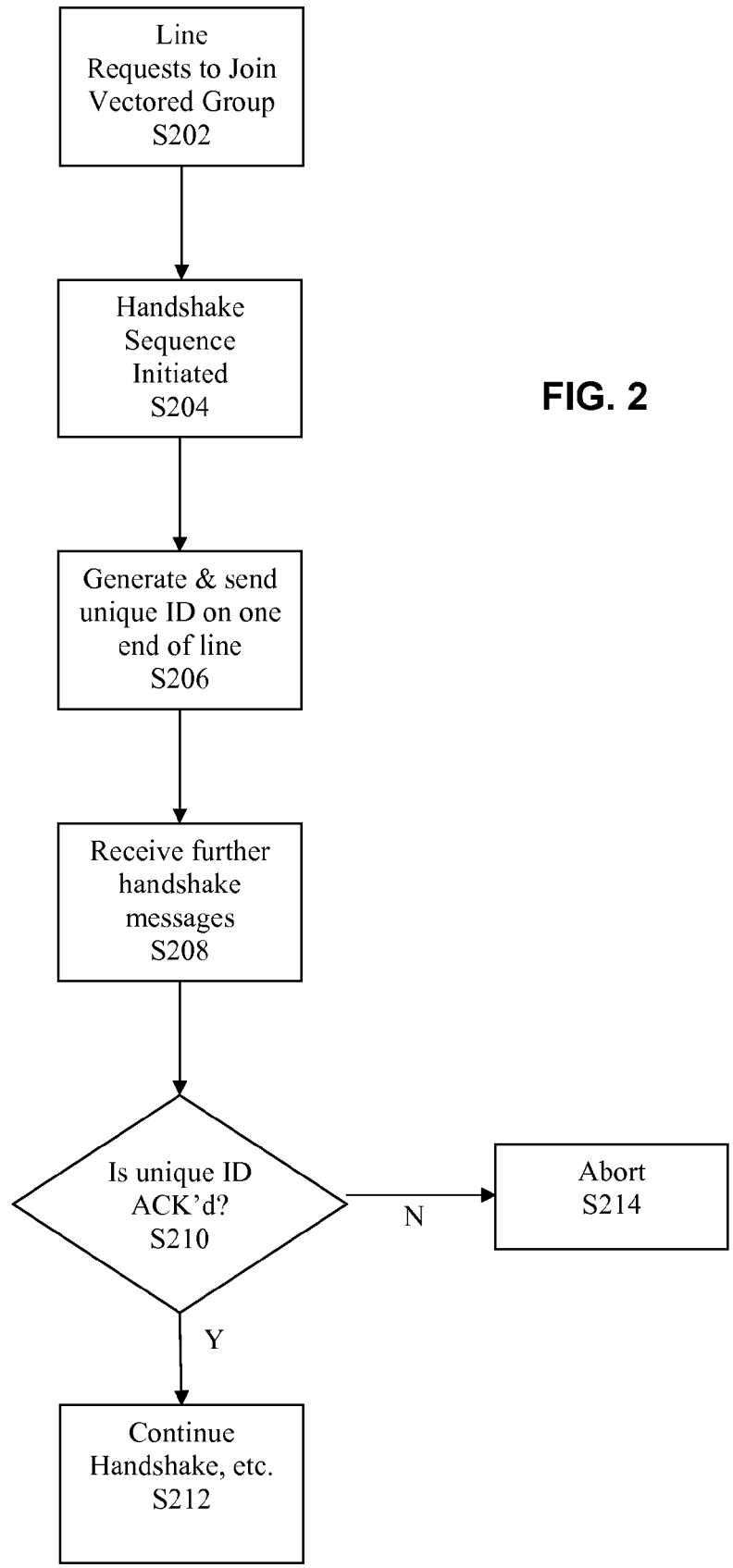
FIG. 2 is a flowchart illustrating an example method for a handshake procedure according to embodiments of the invention.

FIG. 2 is a flowchart illustrating an example methodology according to embodiments of the invention.

In the example of FIG. 2, the process starts when a line requests to join a vectored group (step S202). This can occur, for example, after a new CPE modem comes online, such as when a CPE modem is powered on or restarted.

According to the standardized vectored DSL protocols of G.993.2, a handshake procedure such as that specified by G.994.1 is initiated very early in the process of a new line requesting to join a vectored group (step S204). This handshake procedure is initiated by, for example, a CO modem attached to the same line as the CPE modem.

According to aspects of the invention, the conventional handshake procedure is supplemented by additional steps such as that shown in step S206. During handshake, one or both of the CO and CPE side modems (i.e. xTU-R or xTU-C) generates and sends a unique ID to the other modem. In embodiments, the unique ID can be a 16-bit (i.e. 2 bytes) number generated by, for example a pseudo-random number generator. However, the invention is not limited to any specific length or generation technique. Preferably, the ID generation technique and length should provide a very low probability of false duplicates in a particular time frame and environment, which can be determined and established by those skilled in the art.

Next, in step S208, the modems exchange subsequent handshake messages. In step S210, the modem(s) that sent a unique ID determines whether the subsequent handshake messages include an acknowledgment by the other modem of their ID. In other words, after sending their unique ID to the other modem, a subsequent handshake message from the other modem should include the same unique ID sent by the modem (i.e. the unique ID is acknowledged by the other modem).

If a modem that sent a unique ID in step S206 does not receive an acknowledgment of the ID it sent, or if a subsequent message includes an ID that is not the same as the ID it sent, the handshake sequence is aborted by the sending modem in step S214. Otherwise, the handshake procedure continues until it is completed as normal, and then subsequent procedures such as training are commenced.

Figure 3:
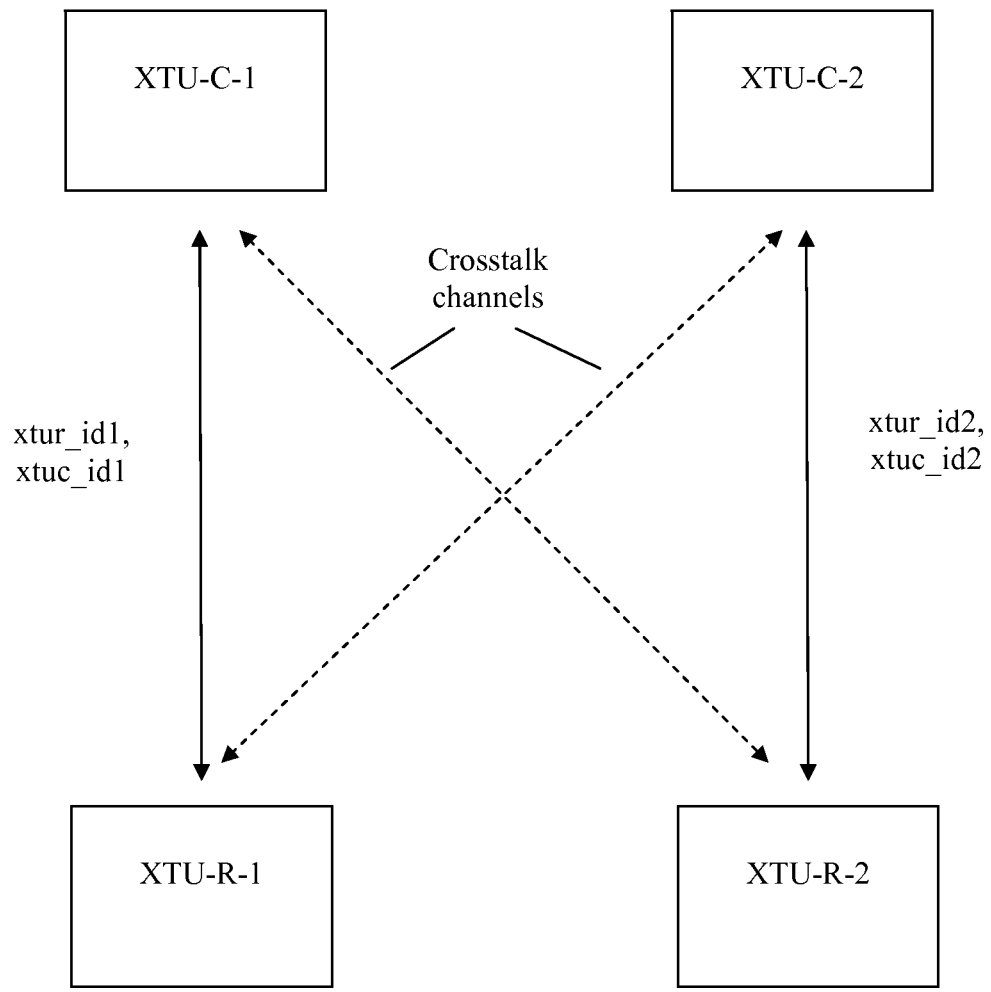
FIG. 3 is a diagram illustrating an example implementation of a handshake procedure according to embodiments of the invention.

FIG. 3 illustrates an example implementation of a robust handshake procedure according to embodiments of the invention.

As shown in FIG. 3, either the line terminated by transceivers XTU-C-1 and XTU-R-1 or the line terminated by transceivers XTU-C-2 and XTU-R-2 is attempting to start a valid handshake procedure, whereas as any transceiver on the other line is attempting to eavesdrop via a crosstalk channel.

In this example, the handshaking procedure of the invention is implemented by adding new fields to existing g.hs messages of G.994.1. In one example embodiment, and as shown in FIG. 3, the following procedures are added during handshake to disambiguate remote transceivers in both upstream and downstream:

TABLE 1

Robust Handshake Protocol.

| Steps | Additional Procedure | g.hs message |
|---|---|---|
| 1. | xTU-R communicates unique xtur_id to xTU-C | MR/CLR |
| 2. | xTU-C responds with a unique xtuc_id and xtur_id | MS/CL |
| 3. | xTU-R responds with received xtuc_id | ACK |

In one example, xtur_id and xtuc_id are 16-bit random numbers. However, this example is non-limiting.

As shown in FIG. 3, using the mechanism above, either an xTU-R or xTU-C transceiver that is 'eavesdropping' over a cross-talk channel can realize early that the remote transceiver is talking to someone else and could abort line activation. In particular, in the example of FIG. 3, x-TU-C-2 can abort the handshake procedure if the xtuc_id value in the g.hs ACK message received from xTU-R-1 via the crosstalk channel according to the invention does not match its own unique xtuc_id value.

Additionally or alternatively in any of the above embodiments, unique ID(s) may also be communicated between transceivers in the O-SIGNATURE message of G.vector for additional or final verification of a unique communication link prior to sending the upstream pilot sequences.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A method for identifying transceivers that train on a far-end crosstalk channel, comprising:
  initiating a handshake phase comprising a plurality of handshake messages between a first transceiver and a second transceiver;
  generating a unique identifier (ID) associated with the first transceiver at the first transceiver;

sending the unique ID associated with the first transceiver from the first transceiver to the second transceiver using one of the handshake messages;

receiving a subsequent handshake message at the first transceiver; and aborting the handshake phase at the first transceiver if the received subsequent handshake message does not include the unique ID associated with the first transceiver.

2. The method of claim 1, wherein at least one of the plurality of handshake messages comprises a G.994.1 handshake (g.hs) message.

3. The method of claim 2, wherein the at least one of the plurality of handshake messages comprises a mode request/capabilities list and request (MR/CLR) g.hs message.

4. The method of claim 2, wherein the at least one of the plurality of handshake messages comprises a mode select/capabilities list (MS/CL) g.hs message.

5. The method of claim 2, wherein the received subsequent handshake message comprises a MS/CL g.hs message.

6. The method of claim 2, wherein the received subsequent handshake message comprises an acknowledgment (ACK) g.hs message.

7. The method of claim 1, wherein the one handshake message includes a field for the unique ID.

8. The method of claim 1, wherein the unique ID comprises a 16-bit number.

9. The method of claim 1, wherein generating the unique ID includes generating a random number.

10. The method of claim 1, further comprising:
generating a second unique ID associated with the second transceiver at the second transceiver;
sending the second unique ID from the second transceiver to the first transceiver using another one of the handshake messages;
receiving a subsequent handshake message at the second transceiver; and
aborting the handshake phase at the second transceiver if the received subsequent handshake message does not include the second unique ID.

11. The method of claim 1, further comprising:
progressing to an O-SIGNATURE phase of G.vector initialization if the handshake phase was not aborted;
sending the unique ID associated with the first transceiver from the first transceiver to the second transceiver during the O-SIGNATURE phase; and
aborting the O-SIGNATURE phase at the second transceiver if the unique ID does not match the unique ID sent during the handshake phase.

12. A communication device comprising:
a processor;
a memory in electronic communication with the processor;
instructions stored in the memory, where in the instructions are executable by the processor to cause the communication device to:
initiate a handshake phase comprising a plurality of handshake messages with a remote transceiver;
generate a unique identifier (ID) associated with the communication device;
send the unique ID associated with the communication device to the remote transceiver using one of the handshake messages;
receive a subsequent handshake message; and
abort the handshake phase if the at least one received subsequent handshake message does not include the unique ID associated with the communication device.

13. The communication device of claim 12, wherein at least one of the plurality of handshake messages comprises a G.994.1 handshake (g.hs) message.

14. The communication device of claim 13, wherein the at least one of the plurality of handshake messages comprises a mode request/capabilities list and request (MR/CLR) g.hs message.

15. The communication device of claim 13, wherein the at least one of the plurality of handshake messages comprises a mode select/capabilities list (MS/CL) g.hs message.

16. The communication device of claim 13, wherein the received subsequent handshake message comprises a MS/CL g.hs message.

17. The communication device of claim 13, wherein the received subsequent handshake message comprises an acknowledgment (ACK) g.hs message.

18. The communication device of claim 12, wherein the one handshake message includes a field for the unique ID.

19. The communication device of claim 12, wherein generating the unique ID includes generating a random number.

20. The communication device of claim 12, wherein the instructions further cause the processor to:
progress to an O-SIGNATURE phase of G.vector initialization if the handshake phase was not aborted;
send the unique ID to the remote transceiver during the O-SIGNATURE phase; and
receive an indication of abortion of the O-SIGNATURE phase at the second transceiver if the unique ID does not match the unique ID sent during the handshake phase.

* * * * *